（12）United States Patent
Shen

(10) Patent No.: US 10,607,428 B1
(45) Date of Patent: Mar. 31, 2020

(54) DOOR ACCESS CONTROL METHOD USING A HAND GESTURE

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 0 days.

(21) Appl. No.: 16/233,185

(22) Filed: Dec. 27, 2018

(51) Int. Cl.
*G07C 9/00* (2020.01)
*G06K 9/00* (2006.01)
*E06B 7/28* (2006.01)
*E05B 47/00* (2006.01)

(52) U.S. Cl.
CPC .......... *G07C 9/00158* (2013.01); *E05B 47/00* (2013.01); *E06B 7/28* (2013.01); *G06K 9/00288* (2013.01); *G06K 9/00355* (2013.01)

(58) Field of Classification Search
CPC ....... G07C 9/00158; E05B 47/00; E06B 7/28; G06K 9/00288; G06K 9/00355
See application file for complete search history.

(56) References Cited

U.S. PATENT DOCUMENTS

| | | | | |
|---|---|---|---|---|
| 2004/0247279 A1* | 12/2004 | Platt | ............... | G07C 9/00 386/224 |
| 2016/0300410 A1* | 10/2016 | Jones | ............... | G06K 9/00288 |
| 2017/0140593 A1* | 5/2017 | Pluss | ............... | G07C 9/00309 |
| 2017/0148243 A1* | 5/2017 | Shin | ............... | G07C 9/00563 |
| 2017/0251092 A1* | 8/2017 | Elie | ............... | H04W 4/80 |

* cited by examiner

*Primary Examiner* — Thomas S McCormack
(74) *Attorney, Agent, or Firm* — Alan D. Kamrath; Karin L. Williams; Mayer & Williams PC

(57) ABSTRACT

A door access control method includes capturing an identification information of a person in an identity verification range. A hand gesture of the person is detected when the captured identification information matches with an authenticated identification information. A door access operation is carried out to permit the person to pass through the door when the hand gesture is identified correct. On the other hand, when the person makes an incorrect hand gesture, does not make any hand gesture, or is located outside of the identity verification range, the door access operation is not carried out to prohibit any person from passing through the door.

20 Claims, 3 Drawing Sheets

DOOR ACCESS CONTROL METHOD USING A HAND GESTURE

BACKGROUND OF THE INVENTION

The present invention relates to a door access control method and, more particularly, to a door access control method using an identity verification and a hand gesture.

With the progress of technologies, door access control changes from manpower and mechanic provisions to electronic provisions. Electronic door access control systems generally include two types: electric control of a door and installation of an electronic lock on a door. In the first type, the door remains in a closed position when no identity verification is carried out or the identity verification fails, such that no person can pass through the door access system. On the other hand, when the identity verification is successful, a driving device, such as an electric motor, moves the door to an open position. In the second type, when no identity verification is carried out or the identity verification fails, the electronic lock is set to a locking state preventing opening of the door. On the other hand, when the identity verification is successful, the electronic lock is set to an unlocking state permitting opening of the door. In either type, a biological identification can be carried out only when a hand of a user reaches the door or the electronic lock. However, both inputting identification data and identifying whether the identification data is correct need a period of time. Thus, the total period of time for passing through the door access system is not reduced (and could even be increased) even though the door access control has been developed into mechanical and electronic provisions.

BRIEF SUMMARY OF THE INVENTION

The present invention provides a door access control method using a hand gesture. The door access control method includes:

detecting whether a person enters an identity verification range, wherein a first identification information of the person is captured when the person is in the identity verification range, and wherein the first identification information of the person is not captured when the person is outside of the identity verification range;

determining whether the captured first identification information is sufficient to initiate a first identity verification procedure, wherein the first identification information of the person is captured again when the captured first identification information is insufficient to initiate the first identity verification procedure, and wherein when recapturing of the first identification information is unsuccessful, capturing of the first identification information is stopped, and the person is prohibited from passing through the door;

comparing the captured first identification information with an authenticated identification information when the captured first identification information is sufficient to initiate the first identity verification procedure, wherein a hand gesture of the person is detected when the captured first identification information matches with the authenticated identification information of an authorized person, and wherein the hand gesture of the person is not detected when the captured first identification information does not match with the authenticated identification information; and identifying whether the hand gesture is correct, wherein a door access operation is carried out to permit the person to pass through the door when the hand gesture is identified correct, and wherein when the person makes an incorrect hand gesture, does not make any hand gesture, or is located outside of the identity verification range, the door access operation is not carried out to prohibit any person from passing through the door.

In an example, the door access control method further includes:

detecting whether the person passes through the door during the door access operation;

maintaining the door access operation for a period of time when no person passes through the door; and prohibiting any person from passing through the door after the period of time has elapsed or the person has passed through the door.

In an example, the period of time is between 5 and 10 seconds.

In an example, the door access control method further includes:

detecting whether any other person is in the identity verification range when the first identity verification is unsuccessful, wherein when no other person is detected, capturing of the first identification information is stopped, and passage through the door is prohibited, wherein when another person is detected in the identity verification range, a second identification information of the another person is captured;

determining whether the captured second identification information is sufficient to initiate a second identity verification procedure, wherein the second identification information of the another person is captured again when the captured second identification information is insufficient to initiate the second identity verification procedure, and wherein when recapturing of the second identification information is unsuccessful, capturing of the second identification information is stopped, and the another person is prohibited from passing through the door;

comparing the captured second identification information with another authenticated identification information when the captured second identification information is sufficient to initiate the second identity verification procedure, wherein a hand gesture of the another person is detected when the captured second identification information matches with the another authenticated identification information of another authorized person; and identifying whether the hand gesture of the another person is correct, wherein the door access operation is carried out to permit the another person to pass through the door when the hand gesture is identified correct, and wherein when the another person makes an incorrect hand gesture, does not make any hand gesture, or is located outside of the identity verification range, the door access operation is not carried out to prohibit any person from passing through the door.

In an example, the door access control method further includes:

detecting whether the another person passes through the door during the door access operation;

maintaining the door access operation for the period of time when no person passes through the door; and prohibiting any person from passing through the door after the period of time has elapsed or the another person has passed through the door.

In an example, capturing the first identification includes capturing a facial pattern of the person or capturing an electronic identification information of a smart mobile device held by the person.

In an example, the hand gesture of the person includes lifting a hand of the person to a position between a chest and a waist of the person or the another person and waving the hand from left to right.

In the door access control method using a hand gesture according to the present invention, even if the person enters the identity verification range and the identity verification is successful, the door will not operate if the person does not make a specific gesture. This avoids mistaken operation when the person has no intention to pass through the door.

The present invention will become clearer in light of the following detailed description of illustrative embodiments of this invention described in connection with the drawings.

DETAILED DESCRIPTION OF THE INVENTION

Figure 1:
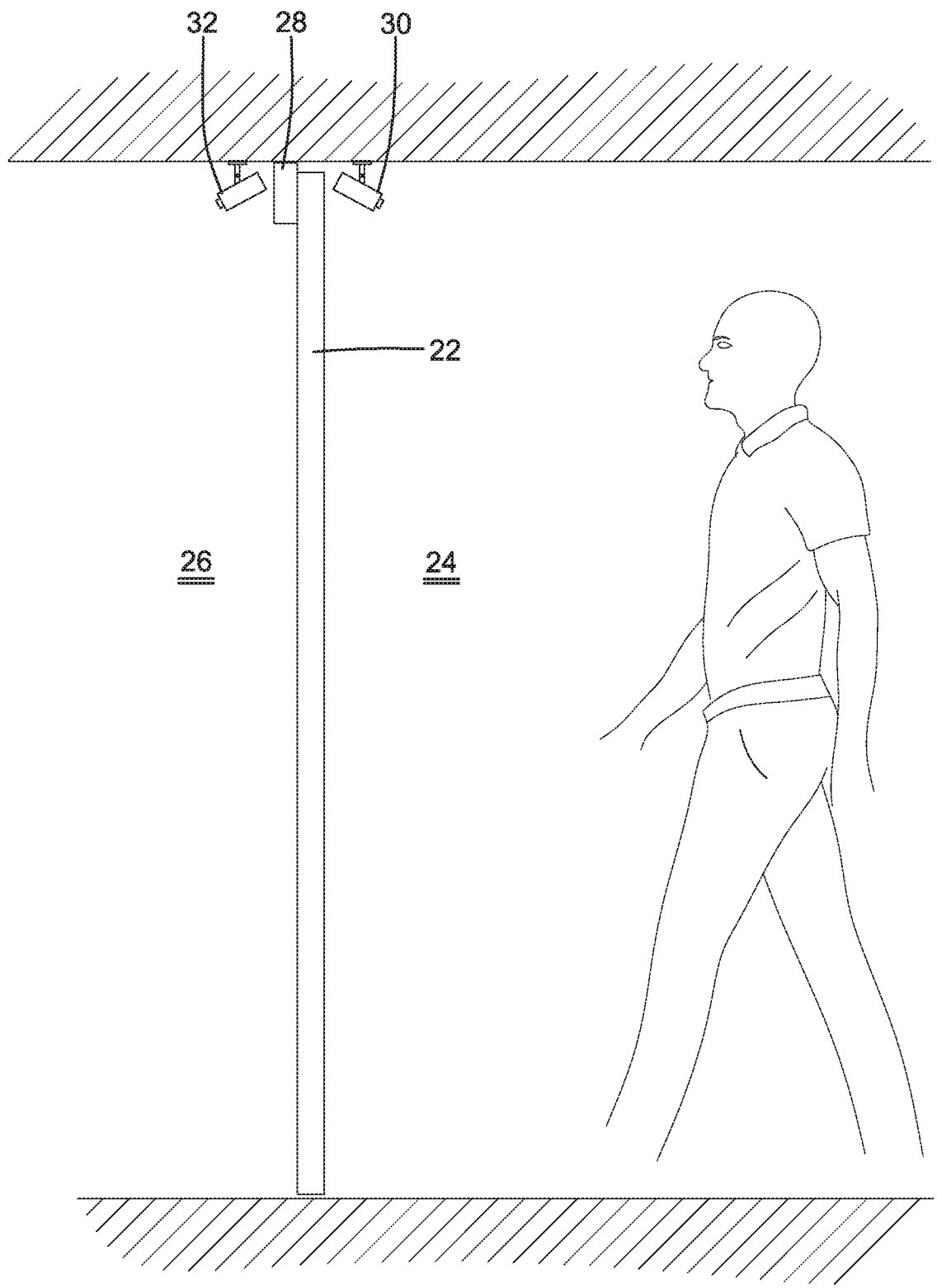
FIG. 1 is a diagrammatic view illustrating a door access device using the door access control method according to the present invention.
Figure 2:
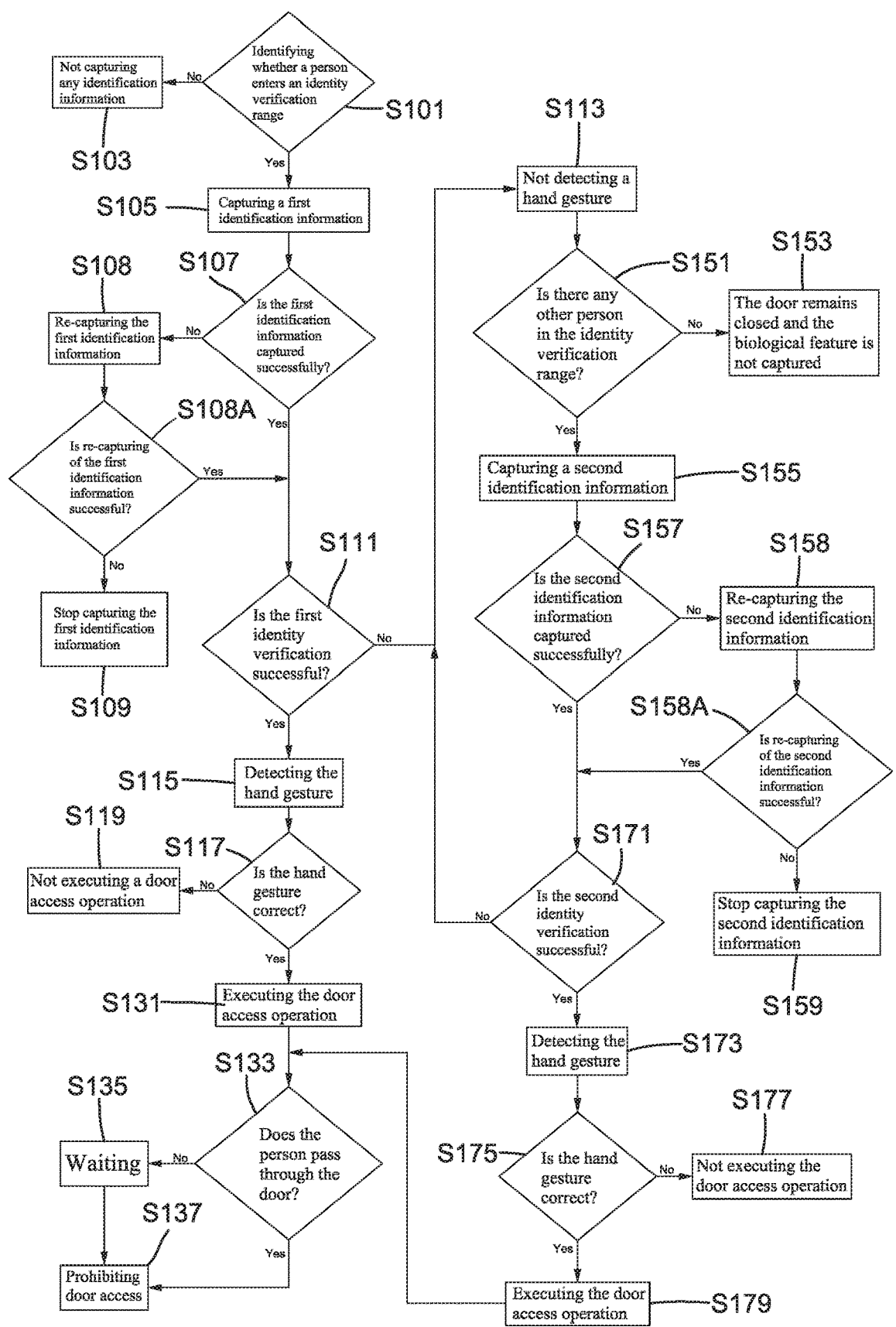
FIG. 2 is a flowchart of an example of the door access control method according to the present invention.

With reference to FIG. 1, a door access device 20 is installed between two spaces. The door access device 20 includes a door movable by electricity and a control device 28 coupled to the door 22. The control device 28 can drive the door 22 to move to an open position and a closed position. The two installation spaces includes an inner side 24 and an outer side 26 separated by the door 22 in the closed position. A first camera 30 is mounted at the first side 24. A second camera 32 is mounted at the second side 26. In the example shown in FIG. 1, the first camera 30 and the second camera 32 are used to pick up the facial pattern and a hand gesture of a user.

A door access control method (hereinafter referred to as "the method") using a hand gesture according to the present invention can be carried out through use of the door control device 20. The method includes detecting whether a person enters an identity verification range (S101) which is predetermined. When the person is inside the identity verification range, a first identification information of the person is captured (S105). On the other hand, when the person is outside of the identity verification range, the first identification information of the person is not captured (S103). Determination of the identity verification range includes using the first camera 30 or the second camera 32 to pick up an image and then identifying whether any person enters the identity verification range. The identity verification range can be any value between 1 meter and 3 meters from the door 22. The first camera 30 or the second camera 32 captures a facial pattern (a biological feature) of any person in the identity verification range as the first identification information.

The next step of the method includes determining whether the first identification information is captured successfully (S107). Specifically, it is determined that whether the captured first identification information is sufficient to initiate a first identity verification procedure, which involves the completeness of the facial pattern captured by the first camera 30 or the second camera 32. If the captured facial pattern is incomplete, the identity verification accuracy will be reduced. For example, when the person turns his or her head or bows while the facial pattern of the person is being captured, the captured facial pattern is only a portion of the whole facial pattern, and the incomplete facial pattern could not be compared with a built-in authenticated identification information.

When the captured first identification information (the facial pattern) is insufficient to initiate the first identity verification procedure, the first identification information of the same person is captured again (S108), and it is identified whether re-capturing of the first identification information is successful (S108A), When re-capturing of the first identification information of the same person is unsuccessful, the first camera 30 or the second camera 32 stops capturing the biological feature (S109), and the control device 28 does not move the door 22 to the open position (namely, the door 22 remains in the closed position), prohibiting the person from passing through the door 22.

The next step includes determining whether the first identity verification is successful when the captured first identification information (captured at step S105 or S108) is sufficient to initiate the first identity verification (S111). Specifically, the captured first identification information (captured at step S105 or S108) is compared with an authenticated identification information of an authorized person. In an example of using the facial pattern to verify the information, a facial pattern of the authorized person is stored in the door access device 20 as an authenticated identification information. The first camera 30 or the second camera 32 captures the facial pattern in the identity verification range as the first identification information which is compared with the authenticated identification information.

When the captured first identification information (captured at step S105 or S108) matches with the authenticated identification information, a hand gesture of the person is detected (step S115). On the other hand, when the captured first identification information (captured at step S105 or S108) does not match with the authenticated identification information, the hand gesture of the person is not detected (step S113). In this embodiment, the hand gesture is detected by using the first camera 30 or the second camera 32 to capture the movement of the left or right hand of the person in the identity verification range.

Then, the hand gesture is identified (S117). When the person makes an incorrect hand gesture, does not make any hand gesture, or is located outside of the identity verification range, a door access operation is not carried out (S119), such that no person can pass through the door. Specifically, the control device 28 does not move the door 22 from the closed position to the open position (in a case that the control device 28 is a door lock, the door lock remains locked). Thus, the person cannot move from the inner side 24 to the outer side 26 or vice versa when the door 22 is closed.

When the hand gesture of the person is identified correct, the door access operation is carried out, such that the person can pass through the door (S131). The control device 28 moves the door 22 from the closed position to the open position, such that the person can move from the inner side 24 to the outer side 26 or vice versa. Identification of the hand gesture includes comparing the captured hand gesture of the person with a defaulted value. In an example, the correct hand gesture is the person moves his or her left hand to a position between the chest and the waist and then waives from left to right. In another example, the correct hand gesture is the person moves his or her right hand to a position between the chest and the waist and then waives from left to right.

Next, it is detected that whether any person passes through the door (S133). Specifically, after the door 22 has reached the open position, a detection device (such as an infrared detection device) on the door 22 detects whether any person moves from the inner side 24 to the outer side 26 through the door or vice versa.

In a case that no person passes through the door 22 during the door access operation, the door access operation remains for a pre-determined period of time (a waiting step S135). In an example, when no person passes through the door 22 in the open position, the door 22 remains in the open position for 5-10 seconds. After the waiting time exceeds the pre-determined period of time (namely, the pre-determined period of time has elapsed) or the person has passed through the door 22, a step of prohibiting door access is carried out (S137) to prohibit any person from passing through the door 22. In an example, a countdown procedure is carried out when the door access operation (S131) is conducted to move the door 22 to the open position. Furthermore, every time a person passes through the door 22, the waiting time is recounted. This procedure repeats until no person passes through the open door 22 during the waiting time (10 seconds in this case). Then, the step of prohibiting door access is carried out (S137), moving the door 22 to the closed position.

It is noted that when the hand gesture is not detected (S113) due to unsuccessful identification in the first identity verification step (S111), a step of detecting whether any other person is located in the identity verification range is carried out (S151). For example, when the captured biological feature of a first person is identified as an unauthorized biological feature, the first camera 30 or the second camera 32 of the door access device 20 automatically searches a second person and captures the facial pattern of the second person as the biological feature.

When the first identity verification fails and when there is no other person in the identity verification range, the door 22 remains closed, and both the first camera 30 and the second camera 32 stop capturing the biological feature (S153). Namely, the door access procedure ends.

On the other hand, when the first identity verification fails and when there is another person in the identity verification range, a second identification information of the another person is captured. In an example, the first camera 30 or the second camera 32 captures the facial pattern of the another person as the second identification information.

The next step of the method includes determining whether the second identification information is captured successfully (S157). Specifically, it is determined that whether the captured second identification information is sufficient to initiate a second identity verification procedure. When the captured facial pattern is insufficient to initiate the second identity verification procedure, the second identification information of the another person is recaptured (S158), and it is identified whether re-capturing of the second identification information is successful (S158A). When recapturing of the second identification information of the another person is unsuccessful, the door access procedure ends (S159). Namely, the first camera 30 or the second camera 32 stops capturing the biological feature, and the control device 28 does not move the door 22 to the open position (namely, the door 22 remains in the closed position), prohibiting the another person to pass through the door 22.

The next step includes determining whether the second identity verification is successful (S171) when the captured second identification information (captured at step S155 or S158) is sufficient to initiate the second identity verification procedure. When the captured second identification information (captured at step S155 or S158) does not match with the another authenticated identification information of another authorized person, the hand gesture of the second person is not detected (step S113). The step of detecting whether there is any other person (for example, a third person) is in the identity verification range (S151) can be repeated until it is confirmed that there is no un-identified person in the identity verification range or the second identity verification is successful.

When the captured second identification information (captured at step S155 or S158) matches with the another authenticated identification information, a hand gesture of the another person is detected (step S173) and identified (S175). When the another person makes an incorrect hand gesture, does not make any hand gesture, or is located outside of the identity verification range, the door access operation is not carried out (S177), such that no person can pass through the door. On the other hand, when the hand gesture of the another person is identified correct, the door access operation is carried out, such that the another person can pass through the door (S179).

Next, it is detected that whether any person passes through the door 22 during the door access operation permitting the another person to pass through the door 22 (S133). In a case that no person passes through the door 22 during the door access operation, the door access operation remains for the pre-determined period of time (the waiting step S135). After the waiting time exceeds the pre-determined period of time or the another person has passed through the door 22, the step of prohibiting door access is carried out (S137) to prohibit any person from passing through the door 22.

Figure 3:
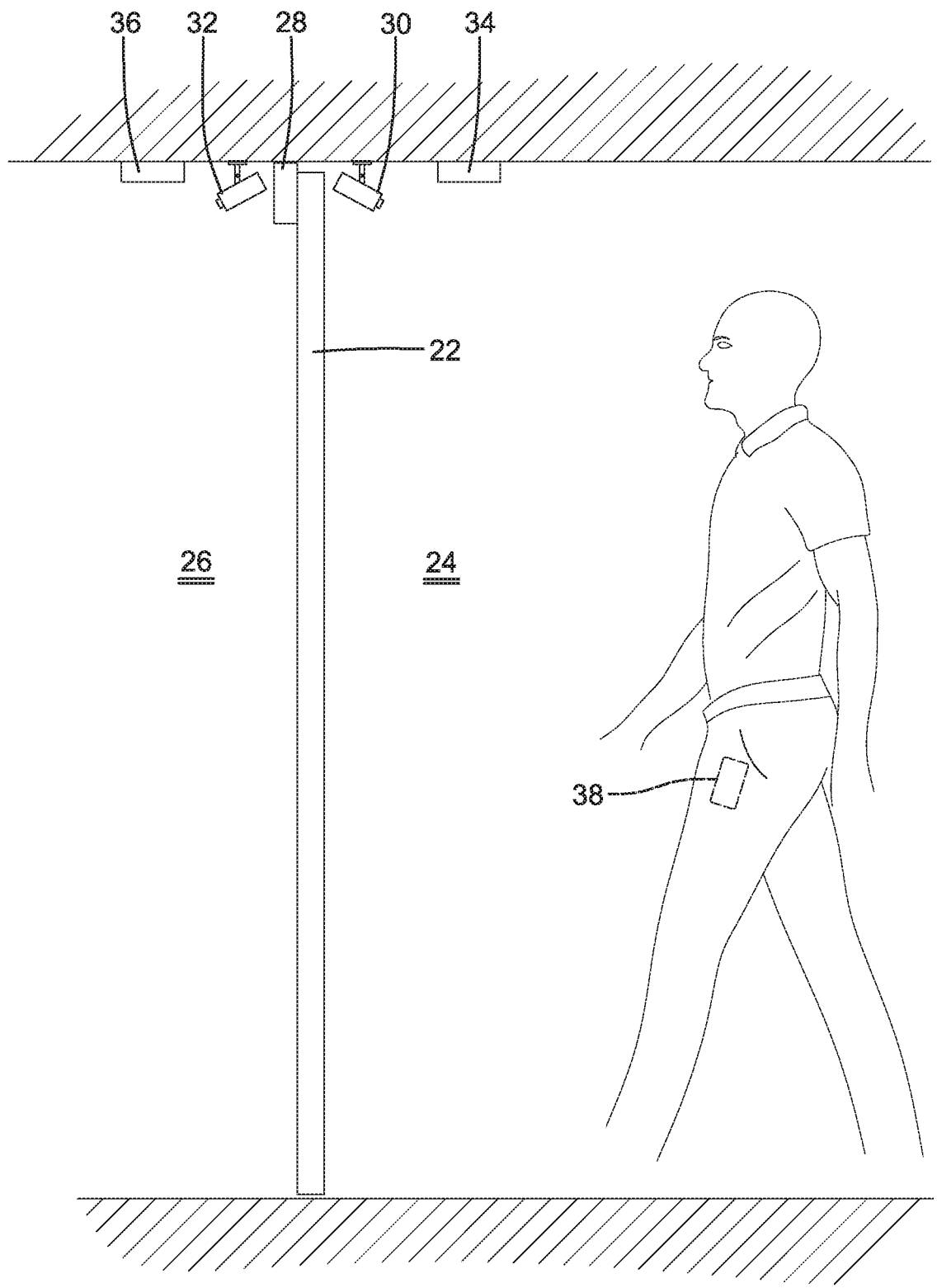
FIG. 3 is a diagrammatic view illustrating another door access device using the door access control method according to the present invention.

The first and second identification informations used in the door control method according to the present invention can be other than biological features. For example, in another embodiment shown in FIG. 3, the first and second identification informations can be unique electronic identification informations built in a smart mobile device 38 held by a person. In this embodiment, the door access device 20 further includes a first wireless communication device 34 mounted at the inner side 24 and a second wireless communication device 36 mounted at the outer side 26. When a person enters the identity verification range, the first wireless communication device 34 or the second wireless communication device 36 captures the first identification information or the second identification information stored in the smart mobile device held by the person. After successful verification of the identification information of the person, the first camera 30 or the second camera 32 captures the hand gesture of the person for determining whether to carry out the door access operation.

In the door access control method using a hand gesture according to the present invention, even if the person enters the identity verification range and the identity verification is successful, the door 22 will not operate if the person does not make a specific gesture. This avoids mistaken operation when the person has no intention to pass through the door 22.

Using the facial pattern as the biological identification basis is advantageously convenient. Specifically, when a person enters the identity verification range (about 1-3 meters from the door the first camera 30 or the second camera 32 automatically captures the facial pattern of the person without the need of operating the door access device 20 by the person. When the person intends to pass through the door 22, the person can move towards the door and can make the correct hand gesture, and the door 22 will move to the open position. After the person has passed through the door 22, the door 22 moves back to the closed position, providing excellent convenience.

Now that the basic teachings of the present invention have been explained, many extensions and variations will be obvious to one having ordinary skill in the art. For example, the door access control method according to the present invention can be used on a door access device for non-electric doors. For example, the door access device includes a lock that is mounted on a door and that is pre-set to a locking state. When a person passes through the identity verification and reaches out his or her hand to hold the door lock (which is considered as the correct hand gesture), the lock is unlocked, and the person can operate the lock to open the door. On the other hand, when the person passing through the identity verification does not reach out his or her hand to hold the lock, the lock remains in the locking state to prohibit passage through the door 22. Nevertheless, other hand gestures can be used, such as reaching out a hand to touch the door 22, to determine whether to open the door 22.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A door access control method using a hand gesture to control passage of a door with the door access control method comprising:
   detecting whether a person enters an identity verification range, wherein a first identification information of the person is captured when the person is in the identity verification range, and wherein the first identification information of the person is not captured when the person is outside of the identity verification range;
   determining whether the captured first identification information is sufficient to initiate a first identity verification procedure, wherein the first identification information of the person is captured again when the captured first identification information is insufficient to initiate the first identity verification procedure, and wherein when recapturing of the first identification information is unsuccessful, capturing of the first identification information is stopped, and the person is prohibited from passing through the door;
   comparing the captured first identification information with an authenticated identification information when the captured first identification information is sufficient to initiate the first identity verification procedure, wherein a hand gesture of the person is detected when the captured first identification information matches with the authenticated identification information of an authorized person, and wherein the hand gesture of the person is not detected when the captured first identification information does not match with the authenticated identification information;
   identifying whether the hand gesture is correct, wherein a door access operation is carried out to permit the person to pass through the door when the hand gesture is identified correct, and wherein when the person makes an incorrect hand gesture, does not make any hand gesture, or is located outside of the identity verification range, the door access operation is not carried out to prohibit any person from passing through the door;
   detecting whether the person passes through the door during the door access operation;
   maintaining the door access operation for a period of time when no person passes through the door; and
   prohibiting any person from passing through the door after the period of time has elapsed or the person has passed through the door,
   wherein the period of time is between 5 and 10 seconds.

2. The door access control method using the hand gesture to control passage of the door as claimed in claim 1, further comprising:
   detecting whether any other person is in the identity verification range when the first identity verification is unsuccessful, wherein when no other person is detected, capturing of the first identification information is stopped, and passage through the door is prohibited, wherein when another person is detected in the identity verification range, a second identification information of the another person is captured;
   determining whether the captured second identification information is sufficient to initiate a second identity verification procedure, wherein the second identification information of the another person is captured again when the captured second identification information is insufficient to initiate the second identity verification procedure, and wherein when recapturing of the second identification information is unsuccessful, capturing of the second identification information is stopped, and the another person is prohibited from passing through the door;
   comparing the captured second identification information with another authenticated identification information when the captured second identification information is sufficient to initiate the second identity verification procedure, wherein a hand gesture of the another person is detected when the captured second identification information matches with the another authenticated identification information of another authorized person; and
   identifying whether the hand gesture of the another person is correct, wherein the door access operation is carried out to permit the another person to pass through the door when the hand gesture is identified correct, and wherein when the another person makes an incorrect hand gesture, does not make any hand gesture, or is located outside of the identity verification range, the door access operation is not carried out to prohibit any person from passing through the door.

3. The door access control method using the hand gesture to control passage of the door as claimed in claim 2, further comprising:
   detecting whether the another person passes through the door during the door access operation;
   maintaining the door access operation for the period of time when no person passes through the door; and
   prohibiting any person from passing through the door after the period of time has elapsed or the another person has passed through the door.

4. The door access control method using the hand gesture to control passage of the door as claimed in claim 2, wherein capturing the second identification information includes capturing a facial pattern of the another person.

5. The door access control method using the hand gesture to control passage of the door as claimed in claim 2, wherein capturing the second identification information includes capturing an electronic identification information of a smart mobile device held by the another person.

6. The door access control method using the hand gesture to control passage of the door as claimed in claim 1, wherein capturing the first identification information includes capturing a facial pattern of the person.

7. The door access control method using the hand gesture to control passage of the door as claimed in claim 1, wherein capturing the first identification information includes capturing an electronic identification information of a smart mobile device held by the person.

8. A door access control method using a hand gesture to control passage of a door, with the door access control method comprising:
   detecting whether a person enters an identity verification range, wherein a first identification information of the person is captured when the person is in the identity verification range, and wherein the first identification information of the person is not captured when the person is outside of the identity verification range;
   determining whether the captured first identification information is sufficient to initiate a first identity verification procedure, wherein the first identification information of the person is captured again when the captured first identification information is insufficient to initiate the first identity verification procedure, and wherein when recapturing of the first identification information is unsuccessful, capturing of the first identification information is stopped, and the person is prohibited from passing through the door;
   comparing the captured first identification information with an authenticated identification information when the captured first identification information is sufficient to initiate the first identity verification procedure, wherein a hand gesture of the person is detected when the captured first identification information matches with the authenticated identification information of an authorized person, and wherein the hand gesture of the person is not detected when the captured first identification information does not match with the authenticated identification information; and
   identifying whether the hand gesture is correct, wherein a door access operation is carried out to permit the person to pass through the door when the hand gesture is identified correct, and wherein when the person makes an incorrect hand gesture, does not make any hand gesture, or is located outside of the identity verification range, the door access operation is not carried out to prohibit any person from passing through the door,
   wherein the hand gesture of the person includes lifting a hand of the person to a position between a chest and a waist of the person and waving the hand from left to right.

9. The door access control method using the hand gesture to control passage of the door as claimed in claim 8, wherein the period of time is between 5 and 10 seconds.

10. The door access control method using the hand gesture to control passage of the door as claimed in claim 8, further comprising:
   detecting whether the person passes through the door during the door access operation;
   maintaining the door access operation for a period of time when no person passes through the door; and
   prohibiting any person from passing through the door after the period of time has elapsed or the person has passed through the door.

11. The door access control method using the hand gesture to control passage of the door as claimed in claim 8, further comprising:
   detecting whether any other person is in the identity verification range when the first identity verification is unsuccessful, wherein when no other person is detected, capturing of the first identification information is stopped, and passage through the door is prohibited, wherein when another person is detected in the identity verification range, a second identification information of the another person is captured;
   determining whether the captured second identification information is sufficient to initiate a second identity verification procedure, wherein the second identification information of the another person is captured again when the captured second identification information is insufficient to initiate the second identity verification procedure, and wherein when recapturing of the second identification information is unsuccessful, capturing of the second identification information is stopped, and the another person is prohibited from passing through the door;
   comparing the captured second identification information with another authenticated identification information when the captured second identification information is sufficient to initiate the second identity verification procedure, wherein a hand gesture of the another person is detected when the captured second identification information matches with the another authenticated identification information of another authorized person; and
   identifying whether the hand gesture of the another person is correct, wherein the door access operation is carried out to permit the person to pass through the door when the hand gesture is identified correct, and wherein when the person makes an incorrect hand gesture, does not make any hand gesture, or is located outside of the identity verification range, the door access operation is not carried out to prohibit any person from passing through the door.

12. The door access control method using the hand gesture to control passage of the door as claimed in claim 11, further comprising:
   detecting whether the another person passes through the door during the door access operation;
   maintaining the door access operation for the period of time when no person passes through the door; and
   prohibiting any person from passing through the door after the period of time has elapsed or the another person has passed through the door.

13. The door access control method using the hand gesture to control passage of the door as claimed in claim 8, wherein capturing the first identification information includes capturing a facial pattern of the person.

14. The door access control method using the hand gesture to control passage of the door as claimed in claim 8, wherein capturing the first identification information includes capturing an electronic identification information of a smart mobile device held by the person.

15. A door access control method using a hand gesture to control passage of a door, with the door access control method comprising:
   detecting whether a person enters an identity verification range, wherein a first identification information of the person is captured when the person is in the identity verification range, and wherein the first identification information of the person is not captured when the person is outside of the identity verification range;

determining whether the captured first identification information is sufficient to initiate a first identity verification procedure, wherein the first identification information of the person is captured again when the captured first identification information is insufficient to initiate the first identity verification procedure, and wherein when recapturing of the first identification information is unsuccessful, capturing of the first identification information is stopped, and the person is prohibited from passing through the door;

comparing the captured first identification information with an authenticated identification information when the captured first identification information is sufficient to initiate the first identity verification procedure, wherein a hand gesture of the person is detected when the captured first identification information matches with the authenticated identification information of an authorized person, and wherein the hand gesture of the person is not detected when the captured first identification information does not match with the authenticated identification information; and identifying whether the hand gesture is correct, wherein a door access operation is carried out to permit the person to pass through the door when the hand gesture is identified correct, and wherein when the person makes an incorrect hand gesture, does not make any hand gesture, or is located outside of the identity verification range, the door access operation is not carried out to prohibit any person from passing through the door, detecting whether any other person is in the identity verification range when the first identity verification is unsuccessful, wherein when no other person is detected, capturing of the first identification information is stopped, and passage through the door is prohibited, wherein when another person is detected in the identity verification range, a second identification information of the another person is captured;

determining whether the captured second identification information is sufficient to initiate a second identity verification procedure, wherein the second identification information of the another person is captured again when the captured second identification information is insufficient to initiate the second identity verification procedure, and wherein when recapturing of the second identification information is unsuccessful, capturing of the second identification information is stopped, and the another person is prohibited from passing through the door;

comparing the captured second identification information with another authenticated identification information when the captured second identification information is sufficient to initiate the second identity verification procedure, wherein a hand gesture of the another person is detected when the captured second identification information matches with the another authenticated identification information of another authorized person; and identifying whether the hand gesture of the another person is correct, wherein the door access operation is carried out to permit the another person to pass through the door when the hand gesture is identified correct, and wherein when the another person makes an incorrect hand gesture, does not make any hand gesture, or is located outside of the identity verification range, the door access operation is not carried out to prohibit any person from passing through the door, wherein the hand gesture of the another person includes lifting a hand of the another person to a position between a chest and a waist of the another person and waving the hand from left to right.

16. The door access control method using the hand gesture to control passage of the door as claimed in claim 15, further comprising:

detecting whether the another person passes through the door during the door access operation;

maintaining the door access operation for the period of time when no person passes through the door; and prohibiting any person from passing through the door after the period of time has elapsed or the another person has passed through the door.

17. The door access control method using the hand gesture to control passage of the door as claimed in claim 15, wherein capturing the first identification information includes capturing a facial pattern of the person.

18. The door access control method using the hand gesture to control passage of the door as claimed in claim 15, wherein capturing the first identification information includes capturing an electronic identification information of a smart mobile device held by the person.

19. The door access control method using the hand gesture to control passage of the door as claimed in claim 15, wherein capturing the second identification information includes capturing a facial pattern of the another person.

20. The door access control method using the hand gesture to control passage of the door as claimed in claim 15, wherein capturing the second identification information includes capturing an electronic identification information of a smart mobile device held by the another person.

* * * * *